(12) United States Patent
Terai et al.

(10) Patent No.: US 9,803,076 B2
(45) Date of Patent: Oct. 31, 2017

(54) RESIN MATERIAL COMPOSITION AND INJECTION MOLDED ARTICLE

(71) Applicant: TOYODA GOSEI CO., LTD., Kiyosu-shi, Aichi-ken (JP)

(72) Inventors: Satsuki Terai, Kiyosu (JP); Hitoshi Uchida, Kiyosu (JP); Kazuyoshi Fujimoto, Kiyosu (JP)

(73) Assignee: TOYOTA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/156,724

(22) Filed: May 17, 2016

(65) Prior Publication Data

US 2016/0347942 A1 Dec. 1, 2016

(30) Foreign Application Priority Data

May 29, 2015 (JP) .................. 2015-110273

(51) Int. Cl.
| | |
|---|---|
| C08L 23/12 | (2006.01) |
| C08L 23/06 | (2006.01) |
| B29K 23/00 | (2006.01) |
| B29K 21/00 | (2006.01) |
| B29K 509/00 | (2006.01) |
| B29K 509/08 | (2006.01) |
| B29K 105/00 | (2006.01) |
| B29K 309/08 | (2006.01) |
| B29K 105/08 | (2006.01) |

(52) U.S. Cl.
CPC .............. *C08L 23/12* (2013.01); *C08L 23/06* (2013.01); *B29K 2021/003* (2013.01); *B29K 2023/06* (2013.01); *B29K 2023/12* (2013.01); *B29K 2105/0067* (2013.01); *B29K 2105/0094* (2013.01); *B29K 2105/0854* (2013.01); *B29K 2309/08* (2013.01); *B29K 2509/00* (2013.01); *B29K 2509/08* (2013.01); *B29K 2995/0046* (2013.01); *B29K 2995/0089* (2013.01)

(58) Field of Classification Search
CPC ....... C08L 23/12; C08L 23/06; B29C 45/0001
See application file for complete search history.

(56) References Cited

U.S. PATENT DOCUMENTS

| | | | |
|---|---|---|---|
| 6,869,982 B2 * | 3/2005 | Dang | .............. C08L 23/04 522/111 |
| 2012/0252932 A1 * | 10/2012 | Sano | ............... C08K 9/06 523/444 |

FOREIGN PATENT DOCUMENTS

| | | |
|---|---|---|
| JP | 06-271722 A | 9/1994 |
| JP | 2004-182826 A | 7/2004 |
| JP | 2011-183638 A | 9/2011 |

* cited by examiner

*Primary Examiner* — Robert Harlan
(74) *Attorney, Agent, or Firm* — Posz Law Group, PLC

(57) ABSTRACT

The present invention provides a resin material composition including 25 to 65% by mass of a thermoplastic polyolefin resin, 0.5 to 22% by mass of a glass wool, and 5 to 35% by mass of a thermoplastic elastomer.

20 Claims, 1 Drawing Sheet

RESIN MATERIAL COMPOSITION AND INJECTION MOLDED ARTICLE

TECHNICAL FIELD

The present invention relates to a resin material composition and an injection molded article formed by injection-molding the resin material composition.

BACKGROUND ART

The proportion of injection molded articles (resins) used for the outer panels and interior and exterior parts of automobiles has been increased from the viewpoint of the weight saving of the automobiles These materials (resin material compositions) have improved rigidity (tensile modulus), impact resistance (Charpy impact value), and other physical properties by adding various fillers into a matrix resin (thermoplastic polyolefin resin). Such resin material compositions are disclosed in Patent Documents 1 to 3.

A resin composition for injection molding disclosed in Patent Document 1 has improved rigidity by adding talc to a matrix resin. Although rigidity is improved, impact resistance is decreased by simply adding talc, and thus the decrease in impact resistance is compensated by further adding fibrous glass fillers (whiskers).

In a thermoplastic resin composition disclosed in Patent Document 2, not talc but a nano-inorganic filler having an average particle diameter of 300 nm or less and fibrous glass fillers are added to a matrix resin. This is because adding both talc and fibrous glass fillers (glass fibers) to the matrix resin can improve rigidity and compensate for decrease in impact resistance but causes excessively high melt viscosity (MFR), which makes it difficult to mold the thermoplastic resin composition.

In a composite material disclosed in Patent Document 3, not long fibrous glass fillers but short fibrous glass fillers are added to a matrix resin (PP resin and the like) because adding the long fibrous glass fillers to the matrix resin results in improving strength but leads to poor surface smoothness (poor appearance) due to easily impaired uniform dispersibility of the long fibrous glass fillers.

CITATION LIST

Patent Document

Patent Document 1: Japanese Patent Application Publication No. H6-271722 (JP 6-271722 A)
Patent Document 2: Japanese Patent Application Publication No, 2004-182826 (JP 2004-182826 A)
Patent Document 3: Japanese Patent Application Publication No. 2011-183638 (JP 2011-183638 A)

SUMMARY OF INVENTION

Technical Problem

As described above, adding an inorganic filler such as talc to a matrix resin improves rigidity but decreases impact resistance. Adding both inorganic filler such as talc and fibrous glass fillers to a matrix resin improves rigidity and compensates for decrease in impact resistance. This, however, leads to poor appearance due to decrease in flowability at the time of injection molding.

In particular, adding long fibrous glass fillers may cause poor appearance at the surface part also due to uneven dispersion of the long fibrous glass fillers. On the other hand, adding short fibrous glass fillers is difficult to cause poor surface appearance as compared to the case where the long fibrous glass fillers are added, but the reinforcement effect (improvement of impact resistance) is not so high as compared to the case where the long fibrous glass fillers are added.

It is an object of the present invention to provide an injection molded article having a good balance of rigidity, impact resistance, and appearance and a material (resin material composition) for the injection molded article.

Solution to Problem

In order to achieve the object described above, the resin material composition and the injection molded article of the present invention are constituted as follows o The resin material composition of the present invention includes 25 to 65% by mass of a thermoplastic polyolefin resin (preferably 30 to 60% by mass), 0.5 to 22% by mass of a glass wool (preferably 1 to 10% by mass), and 5 to 35% by mass of a thermoplastic elastomer. More preferably, the resin material composition further includes 5 to 35% by mass of a non-fibrous inorganic filler. The injection molded article of the present invention is formed from this resin material composition.

The glass wool is added in an amount of 0.5% by mass or more (preferably 1% by mass or more) because impact resistance is improved by this addition. Excessive addition of the glass wool, however, leads to poor appearance because the flowability of the material at the time of injection molding is decreased, and thus it is difficult to mold the composition. Therefore, the formulation ratio of the glass wool should be controlled to 22% by mass or less (preferably 10% by mass or less). The thermoplastic elastomer is added in an amount of 5% by mass or more because impact resistance is improved by this addition. Excessive addition of the thermoplastic elastomer, however, decreases rigidity, and thus the formulation ratio of the thermoplastic elastomer should be controlled to 35% by mass or less as described above.

As described above, well-balanced addition of each of the glass wool and the thermoplastic elastomer in a specific amount can sufficiently improve impact resistance due to the addition of both of the glass wool and the thermoplastic elastomer without significant decrease in flowability caused by the glass wool and decrease in rigidity caused by the thermoplastic elastomer, The non-fibrous inorganic filler is preferably added in an amount of 5% by mass or more because rigidity is improved by this addition. Excessive addition of the non-fibrous inorganic filler, however, decreases impact resistance and flowability at the time of injection molding, and thus the formulation ratio of the non-fibrous inorganic filler should be controlled to 35% by mass or less as described above.

The thermoplastic polyolefin resin is added in an amount of 25% by mass or more (preferably 30% by mass or more) because flowability at the time of injection molding can be ensured by this addition. Excessive addition of the thermoplastic polyolefin resin, however, inevitably decreases the formulation ratio of the fillers (the glass wool, the non-fibrous inorganic filler, the thermoplastic elastomer, and the like). This makes it difficult to ensure sufficient impact resistance and rigidity, and thus the formulation ratio of the thermoplastic polyolefin resin should be controlled to 65% by mass or less (preferably 60% by mass or less) as described above.

Advantageous Effects of invention

According to the present invention, an injection molded article having an excellent balance of rigidity, impact resistance, and appearance can be obtained.

DESCRIPTION OF EMBODIMENTS

Figure 1A:
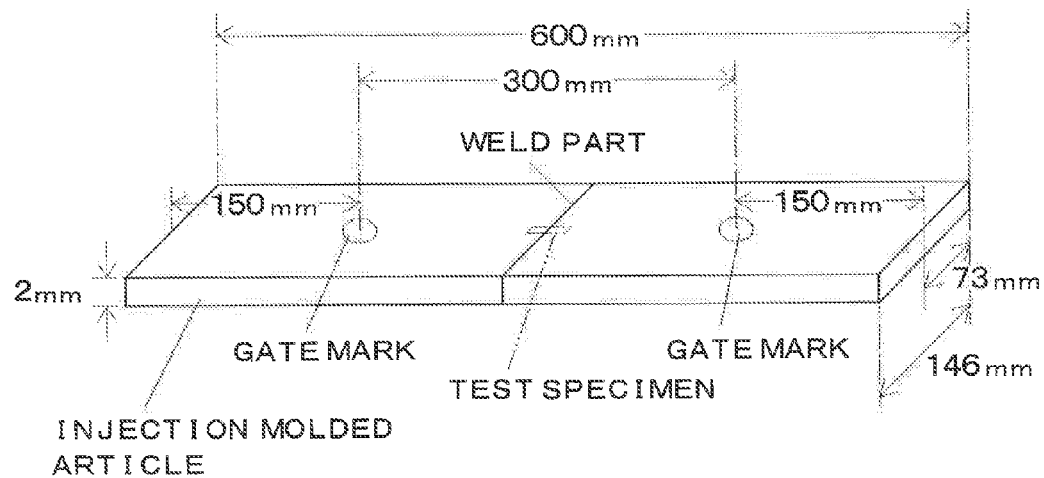
FIG. 1A is a perspective view illustrating an injection molded article used for a measurement test of the raised height of a weld part.

[1] The thermoplastic polyolefin resin is not particularly limited, but examples thereof include polyethylene, polypropylene, polybutadiene, and polycycloolefin. Among them, polypropylene or polyethylene is preferable. This is because both mechanical performance and low cost are required for injection molded articles for automobiles and the like and these resins satisfy both requirements. Here, when a component is simply called a resin in this specification, an elastomer is not included.

MFR (230° C., 2.16 N) of the thermoplastic polyolefin resin is not particularly limited, and the MFR is preferably 37 to 120 g/10 min. The resin having an MFR of 37 g/10 min or more allows glass wool to be easily and uniformly diffused to a terminal weld part and thus appearance smoothness can be easily obtained. On the other hand, few appropriate resins having an MFR of more than 120 g/10 min exist and thus the implementation of the present invention is difficult. Therefore, the MFR is preferably 120 g/10 min or less.

[2] The material of the glass wool is not particularly limited, but examples thereof include quartz glass, and tempered glass.

The average fiber diameter of the glass wool is not particularly limited and is preferably 3 to 20 μm due to the following reason. The glass wool having an average fiber diameter of 3 μm or more is expected to have a reinforcement effect (improved impact resistance). On the other hand, the glass wool having an average fiber diameter of more than 20 μm may exist independently in a linear state in the matrix resin (thermoplastic polyolefin resin) due to difficulty in entanglement of the fibers of the glass wool with each other. Consequently, a high aspect ratio in addition to the above described state may decrease flowability due to the glass wool fibers linearly extending in a hard and long state. This may lead to poor surface appearance. In addition, the glass wool in a linear state may be oriented in a resin flow direction (MD) at the weld part and warpage may also occur due to what is called a spring-back phenomenon, causing adverse effects on the appearance of the weld part and rigidity. In that respect, the glass wool having an average fiber diameter of 20 μm or less is difficult to be in a linear state (difficult to orient) due to flexibility and easy deformation of the glass wool at the time of injection molding, and thus it is expected that the glass wool does not have a significant adverse effect on the appearance (flowability) and the rigidity even if the aspect ratio is high.

The average aspect ratio of the glass wool is not particularly limited and the average aspect ratio is preferably 10 to 100 due to the following reason. The glass wool having an average fiber diameter in the above-described range and an average aspect ratio of 10 or more may result in easy entanglement of the fibers of the glass wool with each other and thus the glass wool may exist in a cotton-like state in which the elongated fibers of the glass wool are bent in the matrix resin. Consequently, the glass wool is expected to be substantially uniformly filled to the terminal thin-walled part (weld part) without being separated from the resin at the time of injection molding. In addition, warpage and a sink mark like shrinkage unevenness along the resin flow direction (MD) and the vertical direction (TD) of MD can be expected to be reduced because the glass wool does not exist in a linear state (exists in a cotton-like state). On the other hand, a glass wool having a too excessively high aspect ratio is difficult to be produced and thus the average aspect ratio is preferably 100 or less as described above.

The surface of the glass wool may not be treated or may be treated with various surface treatment agents. The surface treatment agent of the glass wool is not particularly limited, but examples thereof include a silane coupling agent, a fatty acid, a fatty acid ester, and a carboxylic acid.

[3] The non-fibrous inorganic filler is not particularly limited, but examples thereof include talc, calcium carbonate, kaolin clay, and mica.

The surface of the non-fibrous inorganic filler may not be treated or may be treated with various surface treatment agents The surface treatment agent of the non-fibrous inorganic filler is not particularly limited, but examples thereof include a silane coupling agent, a fatty acid, a fatty acid ester, and a carboxylic acid,

[4] The thermoplastic elastomer is not particularly limited, but examples thereof include various elastomers such as polyolefin elastomers, polystyrene elastomers, polyester elastomers, polyurethane elastomers, polyamide elastomers, acrylic elastomers, vinyl chloride elastomers, and fluorine elastomers.

[5] A method for producing the resin material composition of the present invention is not particularly limited, but examples thereof include a form of melting and kneading the components with an extruder, a mixer, rolls, or the like to obtain the resin material composition.

[6] The present invention is suitable for applications such as outer panels and interior and exterior parts of automobiles. Other than the application to automobiles, the present invention can be applied to various applications. For example, the present invention can be also applied to outer panels and interior and exterior parts of railway cars and various architectural structures, and housings and parts of electric appliances

EXAMPLE

The resin material compositions of Examples 1 to 10 and Comparative Examples 1 to 3 shown in Table 1 were formulated and prepared. An injection molded article was formed from each of the resin material compositions by injection molding, and the physical properties of the articles were tested.

TABLE 1

|  |  | Example 1 | Example 2 | Example 3 | Example 4 |
|---|---|---|---|---|---|
| Matrix Resin | Polypropylene Resin (I) | 50 |  |  |  |
|  | Polypropylene Resin (II) |  |  | 50 |  |
|  | Polypropylene Resin (III) |  | 50 |  |  |
|  | Polypropylene Resin (IV) |  |  |  |  |
|  | Polyethylene Resin |  |  |  | 60 |
| Fibrous Glass Filler | Glass Wool | 8 | 10 | 2 | 20 |
|  | Glass Fiber |  |  |  |  |
| Inorganic Filler | Talc (I) | 2 22 |  | 30 | 5 15 |
|  | Talc (II) | 20 |  |  |  |
|  | Calcium Carbonate |  | 10 |  | 10 |
| Thermoplastic Elastomer | Elastomer (I) | 20 |  |  | 10 |
|  | Elastomer (II) |  | 20 |  |  |
|  | Elastomer (III) |  |  | 20 |  |
| TOTAL |  | 100 | 90 | 102 | 105 |
| Formulation Ratio | Matrix Resin (%) | 50 | 55.56 | 49.02 | 57.14 |
|  | Glass Wool (%) | 8 | 11.11 | 1.96 | 19.05 |
|  | Glass Fiber (%) |  |  |  |  |
|  | Inorganic Filler (%) | 22 | 11.11 | 29.41 | 14.29 |
|  | Elastomer (%) | 20 | 22.22 | 19.61 | 9.52 |
| Tensile Modulus (GPa) |  | 3.3 | 2.2 | 2.7 | 2.5 |
| Charpy Impact Value (kJ/m$^2$) |  | 15 | 12 | 18 | 12 |
| Appearance | Raised Height of Weld Part (μm) | 5 | 7 | 10 | 7 |
|  | Visual Observation of Weld | Good | Good | Good | Good |

|  |  | Example 5 | Example 6 | Example 7 | Example 8 |
|---|---|---|---|---|---|
| Matrix Resin | Polypropylene Resin (I) | 55 |  |  | 40 60 |
|  | Polypropylene Resin (II) |  |  | 40 |  |
|  | Polypropylene Resin (III) |  |  |  | 20 |
|  | Polypropylene Resin (IV) |  |  |  |  |
|  | Polyethylene Resin |  | 40 |  |  |
| Fibrous Glass Filler | Glass Wool | 5 | 1 | 10 | 5 |
|  | Glass Fiber |  |  |  |  |
| Inorganic Filler | Talc (I) |  | 15 30 | 5 20 | 7 27 |
|  | Talc (II) | 10 | 15 | 5 | 10 |
|  | Calcium Carbonate |  |  | 10 | 10 |
| Thermoplastic Elastomer | Elastomer (I) |  | 30 | 25 30 |  |
|  | Elastomer (II) | 30 | 10 |  |  |
|  | Elastomer (III) |  | 20 | 5 | 8 |
| TOTAL |  | 100 | 101 | 100 | 100 |
| Formulation Ratio | Matrix Resin (%) | 55 | 39.60 | 40 | 6 |
|  | Glass Wool (%) | 5 | 0.99 | 10 | 5 |
|  | Glass Fiber (%) |  |  |  |  |
|  | Inorganic Filler (%) | 10 | 29.70 | 20 | 27 |
|  | Elastomer (%) | 30 | 29.70 | 30 | 8 |
| Tensile Modulus (GPa) |  | 2.0 | 2.1 | 2.3 | 2.8 |
| Charpy Impact Value (kJ/m$^2$) |  | 25 | 30 | 15 | 12 |
| Appearance | Raised Height of Weld Part (μm) | 5 | 7 | 10 | 5 |
|  | Visual Observation of Weld | Good | Good | Good | Good |

TABLE 1-continued

| | | Example 9 | Example 10 | Comparative Example 1 | Comparative Example 2 | Comparative Example 3 |
|---|---|---|---|---|---|---|
| Matrix Resin | Polypropylene Resin (I) | | | | | |
| | Polypropylene Resin (II) | | 30 | 60 | | 52 |
| | Polypropylene Resin (III) | 55 | | | | |
| | Polypropylene Resin (IV) | | | | 40 | |
| | Polyethylene Resin | | | | | |
| Fibrous Glass Filler | Glass Wool | 22 | 10 | 22 | | 25 |
| | Glass Fiber | | | | 8 | |
| Inorganic Filler | Talc (I) | 8 | | | 15   25 | 8 |
| | Talc (II) | | | 10 | 10 | |
| | Calcium Carbonate | | 30 | 5 | | |
| Thermoplastic Elastomer | Elastomer (I) | 10   15 | 15 | | 27 | 10   15 |
| | Elastomer (II) | 5 | | 3 | | 5 |
| | Elastomer (III) | | 30 | | | |
| TOTAL | | 100 | 100 | 100 | 100 | 100 |
| Formulation Ratio | MatrixResin (%) | 55 | 30 | 60 | 40 | 52 |
| | Glass Wool (%) | 22 | 10 | 22 | | 25 |
| | Glass Fiber (%) | | | | 8 | |
| | Inorganic Filler (%) | 8 | 30 | 15 | 25 | 8 |
| | Elastomer (%) | 15 | 30 | 3 | 27 | 15 |
| Tensile Modulus (GPa) | | 3.1 | 3.3 | 3.2 | 2.2 | 3.4 |
| Charpy Impact Value (kJ/m$^2$) | | 12 | 7 | 2 | 10 | 10 |
| Appearance | Raised Height of Weld Part (μm) | 9 | 5 | 15 | 25 | 12 |
| | Visual Observation of Weld | Good | Good | Poor | Poor | Poor |

In Table 1, the values in each column of "Matrix resin", "Fibrous glass filler", "Inorganic filler", and "Thermoplastic elastomer" are relative mass (in columns having a right column and left columns, a plurality of materials are used together and values in the left columns indicate a mass of each of the materials and the value in the right column indicates the subtotal of the masses in the left columns) and the total of the relative masses is not always 100 Thus, the values determined by converting the relative value into % by mass are listed in "Formulation ratio". Specific materials used, test methods of physical properties, and the like are as follows.

[Matrix Resins]

Polypropylene Resin (I) is "BX3920" (trade name, manufactured by SI<Global Chemical Co., Ltd., specific gravity 0.93, flexural modulus 1.9 GPa, Izod impact strength (23° C., notched) 6 kJ/m$^2$, melt viscosity (MFR) (230° C., 2.16 N) 100 g/10 min, heat deflection temperature under load (HDT) (0.45 MPa) 135° C., Rockwell hardness 105, tensile strength (TS) 33 MPa, and elongation at break (EB) less than 100%.

Polypropylene Resin (II) is "BH975MO" (trade name, manufactured by Borouge PTE LTD., specific gravity 0.91, flexural modulus 1.5 GPa, izod impact strength (23° C., notched) 8 kJ/m$^2$, melt viscosity (MFR) (230° C., 2.16 N) 38 g/10 min, heat deflection temperature under load (HDT) (0.45 MPa) 96° C., Rockwell hardness 86, tensile strength (TS) 25 MPa, and elongation at break (EB) 4%).

Polypropylene Resin (III) is "NOVATEC PP BC10BH " (trade name, manufactured by Japan Polypropylene Corporation, specific gravity 0.90, flexural modulus 1.6 GPa, Izod impact strength (23° C., notched) 3.5 kJ/m$^2$, melt viscosity (MFR) (230° C., 2.16 N) 119 g/10 min, heat deflection temperature under load (HDT) (0.45 MPa) 108° C., Rockwell hardness 105, tensile strength (TS) 32.5 MPa, and elongation at break (EB) 6%).

Polypropylene Resin (IV) and the glass fibers are a polypropylene resin and glass fibers contained in the glass fiber reinforced resin "PP-GF-50-02" (trade name, manufactured by Daicel. Polymer Ltd.). In other words, this glass fiber reinforced resin is formed by adding the glass fibers to Polypropylene Resin (IV). The inorganic fillers and the thermoplastic elastomer are further added to the glass fiber reinforced resin to be adjusted to the formulation of Comparative Example 2 in Table 1.

Polyethylene Resin is "H6007JU" (trade name, manufactured by SCG Chemicals Co., Ltd., specific gravity 0.96, flexural modulus 1.4 GPa, izod impact strength (23° C., notched) 3.5 kJ/m$^2$, melt viscosity (MFR) (190° C., 2.16 N) 7.5 g/10 min, heat deflection temperature under load (HDT) (0.45 MPa) 75° C., hardness (Shore D) 68, tensile strength (TS) 31 MPa, and elongation at break (BB) greater than 650%).

[Fibrous Glass Fillers]

Glass wools are trial products manufactured by NANODAX CO., Ltd. (no trade name) (average fiber diameter 4 μm and average aspect ratio 100).

[Inorganic Fillers]

Talc (I) is "GH7" (trade name, manufactured by HAYASHI KASEI CO., LTD.). Talc (II) is "NTT05" (trade name, manufactured by IMI FABI Talc Company) Calcium carbonate is "Vigot-15" (trade name, manufactured by Shiraishi Kogyo Co., Ltd.).

[Thermoplastic Elastomers]

Elastomer (I) is "TAFMER DF610" (trade name, manufactured by Mitsui Chemicals, Inc. specific gravity 0.86, melt viscosity (MFR) (230° C., 2.16 N) 2.2 g/10 min, melt viscosity (MFR) (190° C., 2.16 N) 1.2 g/10 min, hardness (Shore A) 57, tensile strength (TS) greater than 3 MPa, and elongation at break (ED) greater than 1,000%).

Elastomer (II) is "ENGAGE 8842" (trade name, manufactured by Dow Chemical. Company, specific gravity 0.86, melt viscosity (MFR) (190° C., 2.16N) 1.0 g/10 min, hardness (Shore A) 54, tensile strength (TS) 3 MPa, and elongation at break (ED) 1,200%)

Elastomer (III) is "SEPTON 2063" (trade name, manufactured by KURARAY CO., LTD., specific gravity 0.88, melt viscosity (MFR) (230° C., 2.16 N) 7.0 g/10 min, hardness (Shore A) 36, tensile strength (TS) 10.8 MPa, and elongation at break (EB) 1200%).

[Test Methods for Physical Properties]

Tensile modulus was measured by carrying out the tensile test in accordance with JIB K7161 The shape of the test specimen was determined to be Type 1A, the tensile speed was determined to be 1 mm/min, and the gauge length was determined to be 50 mm. Charpy impact value was measured by carrying out the Charpy impact test (23° C., notched) in accordance with JIS K7111. The notch was Type A.

Figure 1B:
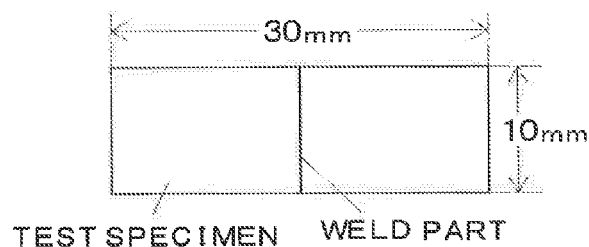
FIG. 1B is a plane view illustrating a test specimen cut off from the injection molded article.
Figure 1C:
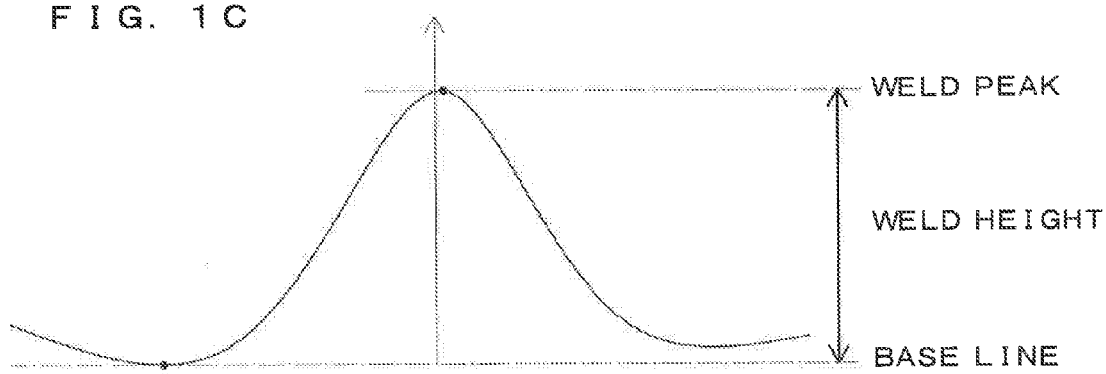
FIG. 1C is a graph illustrating the surface height of the test specimen.

The raised height of a weld part was measured as follows The resin material composition was injected into a mold through two gates (distance between centers of the gates 300 mm) (resin temperature 175 to 200° C., mold temperature 80° C., and holding pressure 20 MPa) to carry out the injection molding of the plate-like injection molded article having a length of 600 mm, a width of 146 mm, and a thickness of 2 mm. Subsequently, a test specimen including the weld part was cut off from the center part of the plate-like injection molded article as illustrated in FIG. 1A. Specifically, the test specimen was a test specimen having a length of 30 mm and a width of 10 mm, and, as illustrated in FIG. 1B, was cut off so that the weld part extending to the width direction was located at the center of the test specimen in the length direction. Subsequently, the height of the weld part and the height of the surface around the weld part of the test specimen were measured in a range of about 20 mm in the length direction of the test specimen with a laser microscope. By this measurement, for example, the graph illustrated in FIG. 1C is obtained. The height difference between the base line and the weld peak in this graph is determined to be the raised height of the weld part. The laser microscope described above is "VK-X100" (trade name, manufactured by KEYENCE CORPORATION), "Visual observation of weld" shows whether appearance at and around the weld part is good or poor when visually determined. "Good" shows that the appearance was determined to be good, and "Poor" shows that the appearance was determined to be poor.

[Physical Properties]

As shown in Table 1, any of tensile modulus, Charpy impact value, and raised height of the weld part (visual observation) are not good in the injection molded articles of Comparative Examples 1 to 3, whereas the injection molded articles of Examples 1 to 10 have a tensile modulus of 2.0 to 3.3 GPa, a Charpy impact value of 7 to 30 KJ/m$^2$, and a raised height of the weld part of 5 to 10 μm, (visually good), which are good and well-balanced.

The present invention is not limited to Examples and can be changed and embodied appropriately without departing from the scope and spirit of the invention.

The invention claimed is:

1. A molded article of a resin material composition comprising:
   a mixture of different thermoplastic polymer materials including a thermoplastic polyolefin resin as a matrix resin and a thermoplastic elastomer; and
   a glass wool, wherein
   the thermoplastic polyolefin resin is contained in the resin material composition at a formulation ratio of 25 to 65% by mass,
   the glass wool is contained in the resin material composition at a formulation ratio of 0.5 to 22% by mass, the glass wool has elongated fibers entangled with each other in an arrangement consistent with cotton and the elongated fibers of the glass wool are bent and contained within the matrix resin,
   the thermoplastic elastomer is contained in the resin material composition at a formulation ratio of 5 to 35% by mass, and
   the molded article has a Charpy impact value of 7 KJ/m$^2$ or more which is measured by carrying out the Charpy impact test ((23° C., notched, a notch: Type A) in accordance with JIS K7111) of the molded resin material.

2. The molded article of a resin material composition according to claim 1, further comprising a non-fibrous inorganic filler in the resin material composition at a formulation ratio of 5 to 35%.

3. The molded article of a resin material composition according to claim 1, wherein the thermoplastic polyolefin resin is contained in the resin material composition at a formulation ratio of 30 to 60% by mass.

4. The molded article of a resin material composition according to claim 2, wherein the thermoplastic polyolefin resin is contained in the resin material composition at a formulation ratio of 30 to 60% by mass.

5. The molded article of a resin material composition according to claim 1, wherein the thermoplastic polyolefin resin in the resin material composition has an MFR (230° C., 2.16 N) of 37 to 120 g/10 min.

6. The molded article of a resin material composition according to claim 2, wherein the thermoplastic polyolefin resin in the resin material composition has an MFR (230° C., 2.16 N) of 37 to 120 g/10 min.

7. The molded article of a resin material composition according to claim 3, wherein the thermoplastic polyolefin resin in the resin material composition has an MFR (230° C., 2.16 N) of 37 to 120 g/10 min.

8. The molded article of a resin material composition according to claim 4, wherein
   the thermoplastic polyolefin resin in the resin material composition has an MFR (230° C., 2.16 N) of 37 to 120 g/10 min, and
   a raised height of a weld part of the molded article is 10 μm or less.

9. A resin material composition comprising:
   a mixture of different thermoplastic polymer materials including a thermoplastic polyolefin resin as a matrix resin and a thermoplastic elastomer; and
   a glass wool, wherein
   the thermoplastic polyolefin resin has a hardness greater than a hardness of the thermoplastic elastomer,
   the thermoplastic polyolefin resin is contained in the resin material composition at a formulation ratio of 25 to 65% by mass,
   the glass wool is contained in the resin material composition at a formulation ratio of 0.5 to 22% by mass, the glass wool has elongated fibers entangled with each other in an arrangement consistent with cotton and the elongated fibers of the glass wool are bent and contained within the matrix resin, and the thermoplastic elastomer is contained in the resin material composition at a formulation ratio of 5 to 35% by mass.

10. The resin material composition according to claim 9, further comprising a non-fibrous inorganic filler in the resin material composition at a formulation ratio of 5 to 35%.

11. The resin material composition according to claim 9, wherein the thermoplastic polyolefin resin is contained in the resin material composition at a formulation ratio of 30 to 60% by mass.

12. The resin material composition according to claim 10, wherein the thermoplastic polyolefin resin is contained in the resin material composition at a formulation ratio of 30 to 60% by mass.

13. The resin material composition according to claim 9, wherein the thermoplastic polyolefin resin in the resin material composition has an MFR (230° C., 2.16 N) of 37 to 120 g/10 min.

14. The resin material composition according to claim 10, wherein the thermoplastic polyolefin resin in the resin material composition has an MFR (230° C., 2.16 N) of 37 to 120 g/10 min.

15. The resin material composition according to claim 11, wherein the thermoplastic polyolefin resin in the resin material composition has an MFR (230° C., 2.16 N) of 37 to 120 g/10 min.

16. The resin material composition according to claim 12, wherein the thermoplastic polyolefin resin in the resin material composition has an MFR (230° C., 2.16 N) of 37 to 120 g/10 min.

17. An injection molded article comprising the resin material composition as claimed in claim 9 and a raised height of a weld part of the molded article is 10 μm or less.

18. The injection molded article according to claim 17 having a Charpy impact value of 7 KJ/m$^2$ or more which is measured by carrying out the Charpy impact test ((23° C., notched, a notch: Type A) in accordance with JIS K7111) of the molded resin material.

19. The molded article of a resin material composition according to claim 1, wherein the glass wool has an average fiber diameter of 3 to 20 μm and an average aspect ratio of 10 to 100.

20. The resin material composition according to claim 9, wherein the glass wool has an average fiber diameter of 3 to 20 μm and an average aspect ratio of 10 to 100.

* * * * *